Dec. 4, 1928.
M. W. McCONKEY
1,694,075
BRAKE CONTROL
Original Filed June 13, 1925    2 Sheets-Sheet 1
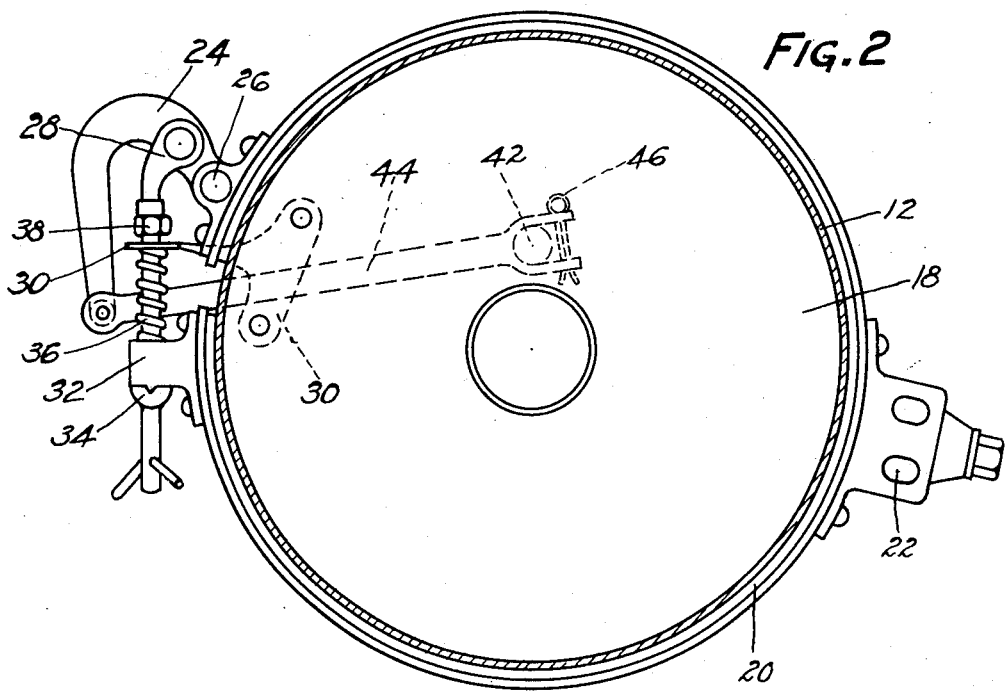
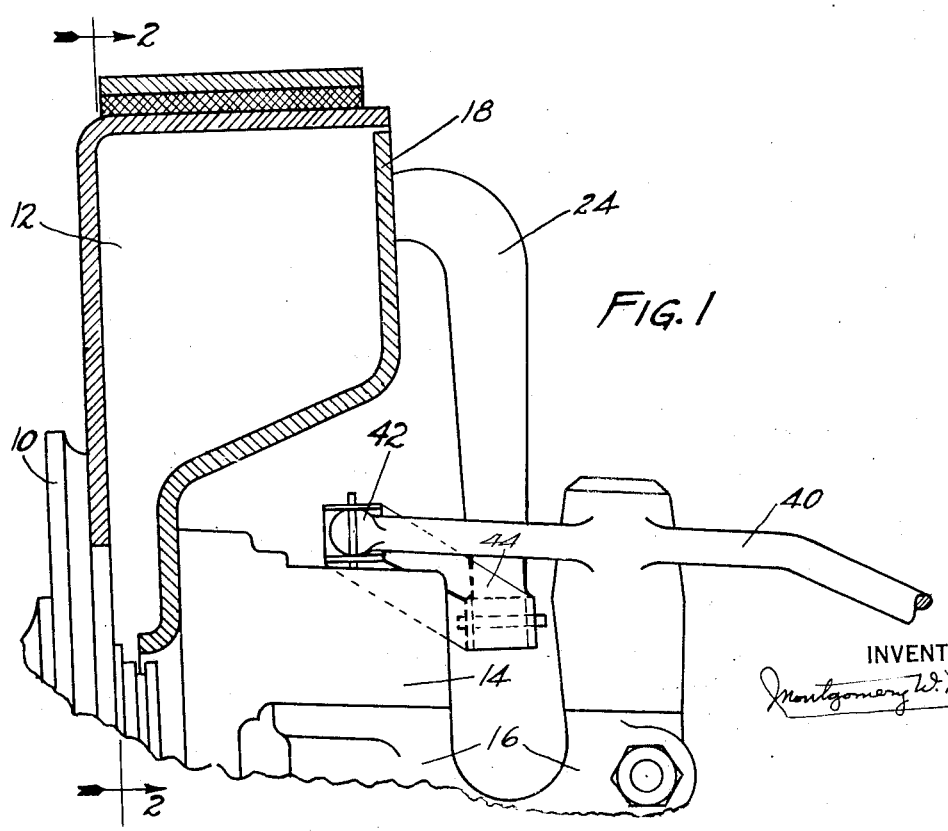
INVENTOR
Montgomery W. McConkey Dec. 4, 1928.  
M. W. McCONKEY  
1,694,075  
BRAKE CONTROL  
Original Filed June 13, 1925   2 Sheets-Sheet 2

INVENTOR  
Montgomery W. McConkey

Patented Dec. 4, 1928.

1,694,075

UNITED STATES PATENT OFFICE.

MONTGOMERY W. McCONKEY, OF SOUTH BEND, INDIANA, ASSIGNOR TO BENDIX BRAKE COMPANY, OF CHICAGO, ILLINOIS, A CORPORATION OF ILLINOIS.

BRAKE CONTROL.

Application filed June 13, 1925, Serial No. 36,847. Renewed April 20, 1928.

This invention relates to brakes for swivelled wheels and is illustrated as embodied in a brake for the front wheel of an automobile chassis. An object of the invention is to provide an inexpensive and simple type of control permitting the swivelling of the wheel and which is operated to control an external contracting brake. In one desirable arrangement the brake is contracted against its drum by means including one part swivelling with the wheel and a non-swivelling part having their point of engagement movable from a position spaced from the swivelling axis to an active position substantially in that axis so that the application of the brake does not interfere with swivelling the wheel. In the arrangements shown in the drawings, the non-swivelling part is a lever which may be pivoted on the axle or on the king pin, and which has one end arranged for movement forwardly from an idle position behind the swivelling axis to an active position substantially in that axis, the brake contracting means pivotally engaging this end of the lever.

Other objects and features of the invention, including an arrangement of a control of this character to permit variation of the pressure on the brake when the wheel is swivelled, and other novel combinations of parts and desirable particular constructions, will be apparent from the following description of two illustrative embodiments shown in the accompanying drawings, in which:

Figure 1 is a vertical section through the upper part of a front wheel automobile brake and associated parts;

Figure 2 is a vertical section just inside the wheel on the line 2—2 of Figure 1 and showing the friction device in side elevation;

Figure 3:
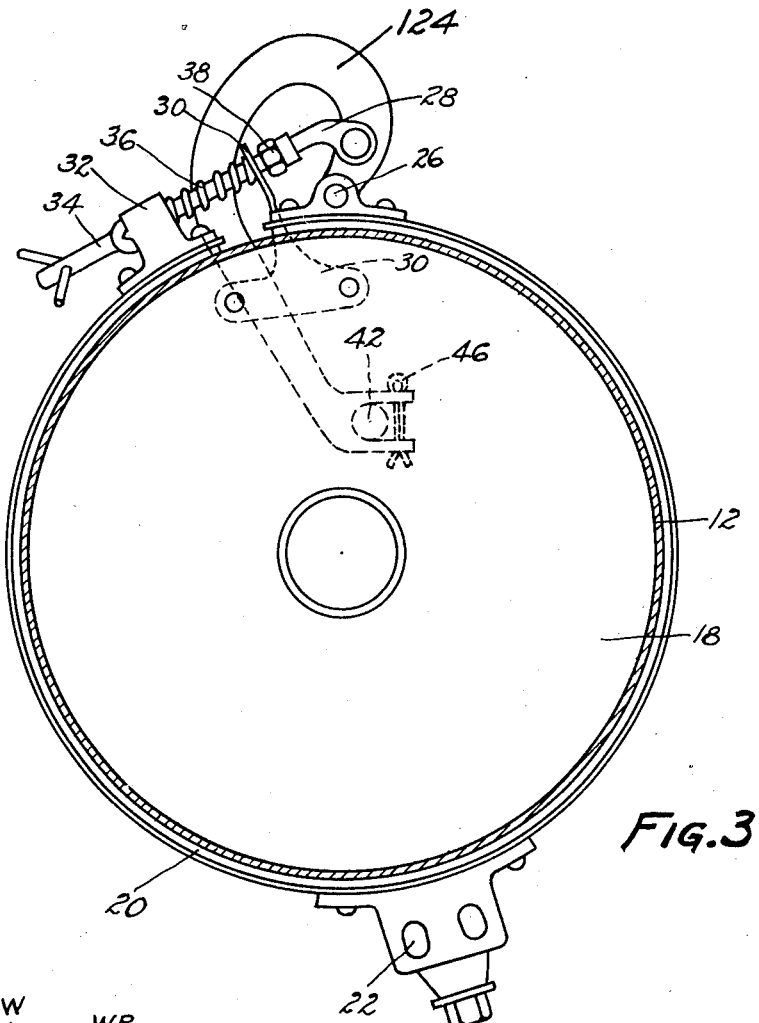
Figure 3 is a view corresponding to Figure 2 but showing a modification.

In the arrangement shown in Figures 1 and 2, the invention is embodied in an automobile chassis having a road wheel with the hub 10 carrying a brake drum 12 and rotatably mounted on a knuckle 14 swivelled by means of the usual king pin or an equivalent at one end of the front axle 16. The knuckle 14 is shown as carrying a stationary support such as the backing plate 18. Except as further described below, these parts may be of any desired construction.

The particular contracting friction device shown in a contractable band 20 having any suitable type of anchor 22 carried by the backing plate 18 or by a bracket secured to the knuckle 14. The free ends of the band are connected by contracting means shown as a brake-applying lever 24 pivotally connected to one end of the band at 26 and having pivotally connected thereto a link 28 passing through an opening in a stationary bracket 30 and through a lug 32 secured to the opposite end of the band, the end of the link having any suitable form of stop 34 engaging the link 32. The return spring 36 is sleeved on the link 28 between the bracket 30 and the lug 32 to expand the band as far as permitted by an adjustable stop 38 which may be threaded on the link 28.

The non-swiveling part of the brake control is shown as a lever 40 pivotally mounted on the axle or on the king pin and having a rounded end 42 which is movable in applying the brake from an idle position spaced behind the swivelling axis to an active position substantially in that axis. In the arrangement of Figures 1 and 2 the part 42 of lever 40 is connected to the lever 24 of the brake contracting means by generally horizontal link 44 forked at its rear end to embrace the ball portion 42 of lever 40 and pivotally connected to the lever 24 at its forward end. In the arrangement of Figure 3 the brake contracting lever 124, corresponding to lever 24, is bent completely around to engage the part 42 of lever 40 directly and may be forked as shown to embrace the part 42. The cotter pin 46 may be provided if desired to prevent accidental separation of parts.

Figure 4:
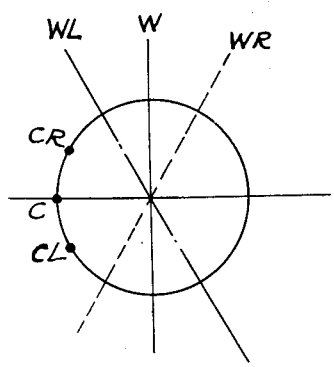
Figure 4 is a diagrammatic top plan view illustrating the release of the outer brake on a turn.

If it is desired to cause variation in the braking when the wheel is swivelled, as, for example, by relieving the pressure on the brake when the wheel is on the outside of a turn, the point of engagement between the part 42 and link 24 or lever 124 is in active position not exactly in the swivelling axis but arranged immediately adjacent that axis. In the diagram of Figure 4, the center of the circle indicates the swivelling axis, and the line W is a line through that axis parallel to the wheel when it is moving straight ahead. Similarly the dotted line WR is parallel to the wheel when swivelled to the right, and the dot-and-dash line WL is a line through the swivelling axis parallel to the wheel when swivelled to the left. The point C indicates the point of engagement between the part 42 and the link 44 or the lever 124, as the case may be, when the wheel is parallel to the line W. When the wheel is swivelled to the right to a position parallel to the line WR the end of the link 44 or the lever 124 is moved to some corresponding position CR,—that is, the link or the lever moves away from the part 42 of lever 40 and relieves the pressure on the brake. On the other hand, if the wheel is swivelled to the left to a position parallel to the line WL, the point C tends to move to CL,—that is, the link 44 or the lever 124 crowds against the part 42 of the lever 40 to increase the pressure on the brake. It will be understood that the two front brakes are not equalized when this action is desired and that the distances in the diagram of Figure 4 are very much exaggerated, being a number of times full size.

The brake shown in Figure 3 may be applied by means of a tension member connected directly to the end of lever 124 in the position shown for the part 42. In this arrangement the parts would be arranged so that the tension element would extend off to the left in Figure 3; that is, Figure 3 would be a section through the right front brake looking from the right side of the automobile instead of a section through the left front brake looking from the left side of the automobile.

While two illustrative embodiments of the invention have been described in detail, it is not my intention to limit its scope to those particular embodiments or otherwise than by the terms of the appended claims.

I claim:

1. A vehicle having, in combination, a swivelled wheel having a drum, a contractable friction device surrounding the drum, means for contracting said device including a part swivelling with the wheel and a non-swivelling part having a point of engagement movable from a position spaced from the swivelling axis to an active position immediately adjacent that axis and so arranged that swivelling the wheel causes variation in the pressure contracting said device.

2. A vehicle having, in combination, a swivelled wheel having a drum, a contractable friction device surrounding the drum, and means for contracting said device including a part swivelling with the wheel and a non-swivelling part having a point of engagement movable in applying the brake from an idle position spaced from the swivelling axis to an active position so arranged immediately adjacent that axis as to relieve the pressure on the brake when the wheel is on the outside of a turn.

3. A vehicle having, in combination, a swivelled wheel having a drum, a contractable friction device surrounding the drum, a pivoted operating lever having a part arranged in idle position behind the swivelling axis, and contracting means for the friction device engaging said part of the lever, the point of engagement being movable in applying the brake forwardly to a position immediately adjacent the swivelling axis between that axis and the wheel.

4. A vehicle having, in combination, a swivelled wheel having a drum, a contractable friction device surrounding the drum, able friction device surrounding the drum, means for contracting said device including a part swivelling with the wheel and a non-swivelling part having a point of engagement movable in an arc from a position spaced from the swivelling axis to an active position immediately adjacent that axis and so arranged that swivelling the wheel causes variation in the pressure contracting said device.

5. A vehicle having, in combination, a swivelled wheel having a drum, a contractable friction device surrounding the drum, a pivoted operating lever having a part arranged in idle position behind the swivelling axis, and contracting means for the friction device engaging said part of the lever, the point of engagement being movable in an arc for applying the brake forwardly to a position immediately adjacent the swivelling axis between that axis and the wheel.

6. Brake mechanism for a swiveled wheel comprising, in combination, a drum rotating with the wheel, a friction device encircling the drum, a lever for contracting said device having its end movable in an arc toward the swiveling axis of the wheel from a position spaced a substantial distance from that axis, and means not swiveling with the wheel and engaging said end of the lever and operating through said lever to apply the brake.

7. Brake mechanism for a swiveled wheel comprising, in combination, a drum rotating with the wheel, a friction device encircling the drum, a lever for contracting said device having its end movable in an arc toward the swiveling axis of the wheel from a position spaced a substantial distance from that axis, and a second lever arranged generally perpendicular to the wheel plane and not swiveling with the wheel and engaging said end of the first lever and operating through said first lever to apply the brake.

8. Brake mechanism for a swiveled wheel comprising, in combination, a drum rotating with the wheel, a friction device encircling the drum, a lever for contracting said device having its end movable in an arc toward the swiveling axis of the wheel from a position spaced a substantial distance from that axis, and a second lever arranged generally perpendicular to the wheel plane and not swiveling with the wheel and pivotally connected to first lever and operating through said first lever to apply the brake.

In testimony whereof I have hereunto signed my name.

MONTGOMERY W. McCONKEY.